United States Patent
Inomata (10) Patent No.: US 9,164,797 B2
(45) Date of Patent: Oct. 20, 2015

(54) INFORMATION PROCESSING APPARATUS, INFORMATION PROCESSING METHOD, AND NON-TRANSITORY COMPUTER READABLE MEDIUM

(71) Applicant: FUJI XEROX CO., LTD, Minato-ku, Tokyo (JP)

(72) Inventor: Kohshiro Inomata, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 160 days.

(21) Appl. No.: 13/895,056

(22) Filed: May 15, 2013

(65) Prior Publication Data
US 2014/0101664 A1    Apr. 10, 2014

(30) Foreign Application Priority Data

Oct. 5, 2012    (JP) .................................. 2012-223491

(51) Int. Cl.
*G06F 9/44*    (2006.01)
*G06F 9/50*    (2006.01)
*G06F 9/445*    (2006.01)

(52) U.S. Cl.
CPC .. *G06F 9/50* (2013.01); *G06F 8/61* (2013.01); *G06F 9/5011* (2013.01)

(58) Field of Classification Search
None
See application file for complete search history.

(56) References Cited

U.S. PATENT DOCUMENTS

| 7,801,994 | B2 * | 9/2010 | Kudo ............................. | 709/226 |
| 2003/0023661 | A1 * | 1/2003 | Clohessy et al. .............. | 709/104 |
| 2004/0060045 | A1 * | 3/2004 | Hind et al. .................... | 717/174 |
| 2005/0060722 | A1 * | 3/2005 | Rochette et al. .............. | 719/319 |
| 2006/0053113 | A1 * | 3/2006 | Hentschel ....................... | 707/10 |
| 2006/0271928 | A1 * | 11/2006 | Gao et al. ...................... | 717/176 |
| 2007/0240160 | A1 * | 10/2007 | Paterson-Jones et al. ..... | 718/104 |
| 2008/0295092 | A1 * | 11/2008 | Tan et al. ...................... | 717/178 |
| 2009/0217279 | A1 * | 8/2009 | Weiberle et al. .............. | 718/104 |
| 2010/0186010 | A1 * | 7/2010 | Chalemin et al. .............. | 718/1 |
| 2012/0297039 | A1 * | 11/2012 | Acuna et al. .................. | 709/223 |
| 2012/0311600 | A1 * | 12/2012 | Takemura ..................... | 718/104 |
| 2013/0311986 | A1 * | 11/2013 | Arrouye et al. ............... | 717/175 |

FOREIGN PATENT DOCUMENTS

JP    2008-118669 A    5/2008

* cited by examiner

*Primary Examiner* — Jason Mitchell
(74) *Attorney, Agent, or Firm* — Sughrue Mion, PLLC (57) ABSTRACT

An information processing apparatus includes an application program information acquisition unit that acquires a resource amount to be used in each of a plurality of operation modes by an application program in operation or an application program desired to be operated, and an operation determination unit that determines, in accordance with the resource amount acquired by the application information acquisition unit, whether the application program desired to be operated is installable and/or startable. The operation program desired to be operated is installed and/or started up in response to a result provided by the operation determination unit.

7 Claims, 7 Drawing Sheets

INFORMATION PROCESSING APPARATUS, INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2012-223491 filed Oct. 5, 2012.

BACKGROUND

Technical Field

The present invention relates to an information processing apparatus, an information processing method, and a non-transitory computer readable medium.

SUMMARY

According to an aspect of the invention, an information processing apparatus is provided. The information processing apparatus includes an application program information acquisition unit that acquires a resource amount to be used in each of a plurality of operation modes by an application program in operation or an application program desired to be operated, and an operation determination unit that determines, in accordance with the resource amount acquired by the application information acquisition unit, whether the application program desired to be operated is installable and/or startable. The operation program desired to be operated is installed and/or started up in response to a result provided by the operation determination unit.

BRIEF DESCRIPTION OF THE DRAWINGS

Exemplary embodiments of the present invention will be described in detail based on the following figures, wherein.

DETAILED DESCRIPTION

Exemplary embodiments of the present invention are described in detail below.

Figure 1:
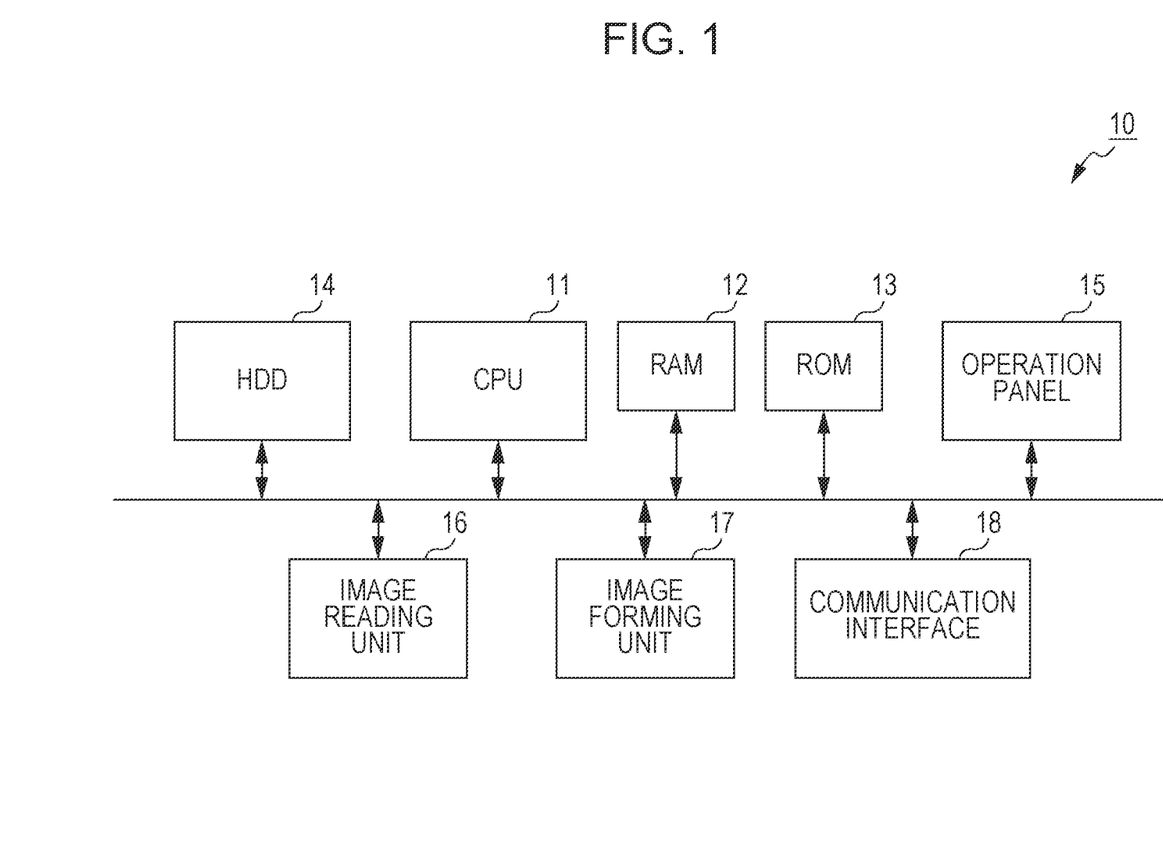
FIG. 1 illustrates a hardware configuration of an image forming apparatus as one example of an image processing apparatus of an exemplary embodiment.

FIG. 1 illustrates a hardware configuration of an image forming apparatus 10 as one example of an image processing apparatus of an exemplary embodiment.

As illustrated in FIG. 1, the image forming apparatus 10 includes a central processing unit (CPU) 11, a random-access memory (RAM) 12, a read-only memory (ROM) 13, a hard-disk drive (HDD) 14, an operation panel 15, an image reading unit 16, an image forming unit 17, and a communication interface 18.

The CPU 11 loads a variety of application programs stored on the ROM 13, the HDD 14, or the like to the RAM 12 and then executes the application programs. The CPU 11 thus performs various function including a copy function and a facsimile function of the image forming apparatus 10.

The RAM 12 serves as a working memory of the CPU 11. In the exemplary embodiment, the RAM 12 functions as a storage unit that stores an application program.

The ROM 13 stores a variety of programs executed by the CPU 11.

The HDD 14 stores image data read by the image reading unit 16 and image data that is used in image forming by the image forming unit 17. The HDD 14 is a hard disk drive, for example. When the CPU 11 installs an application program in the exemplary embodiment, the HDD 14 stores the application program thereon.

As described in detail below, each of the CPU 11, the RAM 12, the ROM 13, and the HDD 14 in the exemplary embodiment functions as an application program information acquisition unit. The application program information acquisition unit stores application programs to cause the image forming apparatus 10 to operate. The application program information acquisition unit acquires a resource amount used in each of plural modes of an application program in operation and an application program desired to be operated. The resource amount may indicate a resource amount used when the image forming apparatus 10 operates with the operation panel 15 used or a resource amount used when the image forming apparatus 10 operates with the operation panel 15 not used.

The operation panel 15 may be a touchpanel, for example. The operation panel 15 receives a display of a variety of information and an operation input from a user. In the exemplary embodiment, the operation panel 15 functions as an operation unit through which a user operates the image forming apparatus 10.

The image reading unit 16 is an example of an image reading unit that reads image information. The image reading unit 16 reads an image recorded on a recording medium, such as a paper sheet. The image reading unit 16 may be a scanner of a charge-coupled device (CCD) type that collects, through a lens, light reflected from an original document when a light beam is projected from a light source to the original document, or may be a scanner of a contact image sensor (CIS) type that receives light reflected from an original document when a light emitting diode (LED) successively emits a light beam onto the original document.

The image forming unit 17 is an example of a printing mechanism that forms an image on a recording medium (such as a recording material or a paper sheet). The image forming unit 17 is a printer, for example. The printer may be of an electrophotographic type that forms an image by transferring toner from a photoconductor drum to the recording medium, or of an ink-jet type that forms an image by ejecting ink onto the recording medium.

The communication interface 18 transmits or receives a variety of information to and from another apparatus directly or via a network. The network herein refers to a local area network (LAN) or the Internet.

A mechanism to install an application program additionally on the image forming apparatus 10 as a built-in apparatus begins to be used. By installing the application program additionally on the image forming apparatus 10 afterwards, functions of the image forming apparatus 10 may be extended. These functions include an authentication function to authenticate a user, and an access function to access an external Web service.

It is noted that a resource amount of the RAM 12 used in the image forming apparatus 10 varies greatly depending on an operation mode of the application program. The operation modes include a mode that is characteristic of a function difference between the application program operated with the operation panel 15 used and the application program operated in the background with the operation panel 15 not used, and a mode that is characteristic of a process speed (operation speed) difference between a high-speed application process speed, a standard-speed application process speed, and a low-speed application process speed. In the exemplary embodiment, the operation determination unit then determines whether to install the application program.

First Exemplary Embodiment

Figure 2:
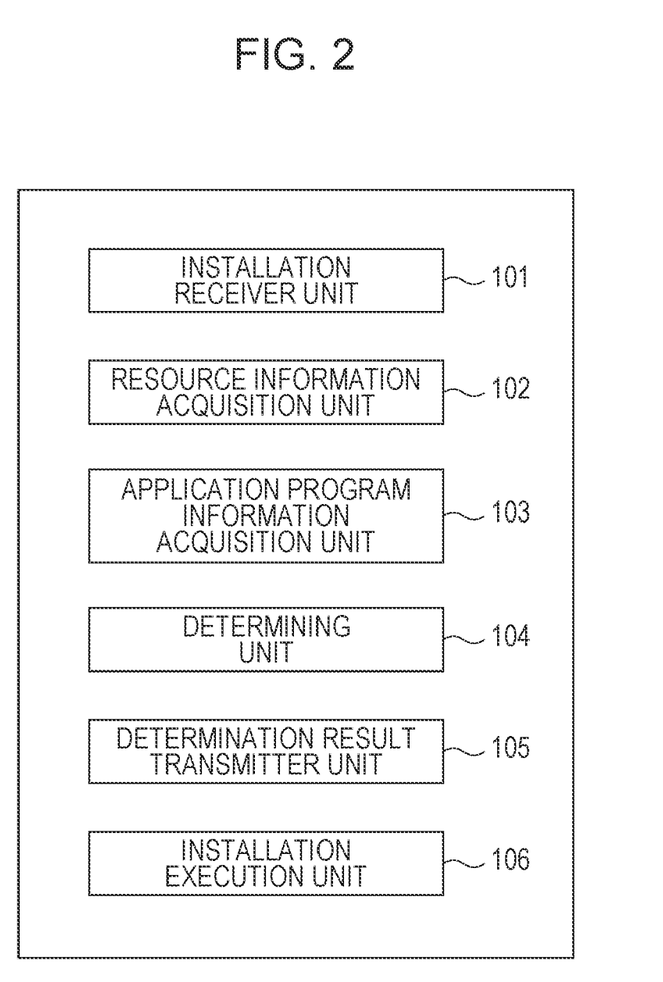
FIG. 2 is a function block diagram of an operation determination unit of a first exemplary embodiment of the present invention.

FIG. 2 is a functional block diagram of the operation determination unit of a first exemplary embodiment. More specifically, FIG. 2 illustrates a function of the operation determination unit as to whether to install the application from among the functions of the operation determination unit.

As illustrated in FIG. 2, the operation determination unit includes an installation receiver unit 101, a resource information acquisition unit 102, an application program information acquisition unit 103, a determining unit 104, a determination result transmitter unit 105, and an installation execution unit 106. The installation receiver unit 101 receives a request to install an additional application program (a new application program). The resource information acquisition unit 102 acquires resource information of the image forming apparatus 10. The application program information acquisition unit 103 acquires information concerning an already installed application program and the additional application program. Based on the resource information and the application program of the image forming apparatus 10, the determining unit 104 determines whether the application program is operable, and determines whether to install the additional application program. The determination result transmitter unit 105 transmits determination results of the determining unit 104. If the determining unit 104 determines that the additional application program is installable, the installation execution unit 106 performs an install operation.

An operation of the operation determination unit of the first exemplary embodiment is described.

Figure 3:
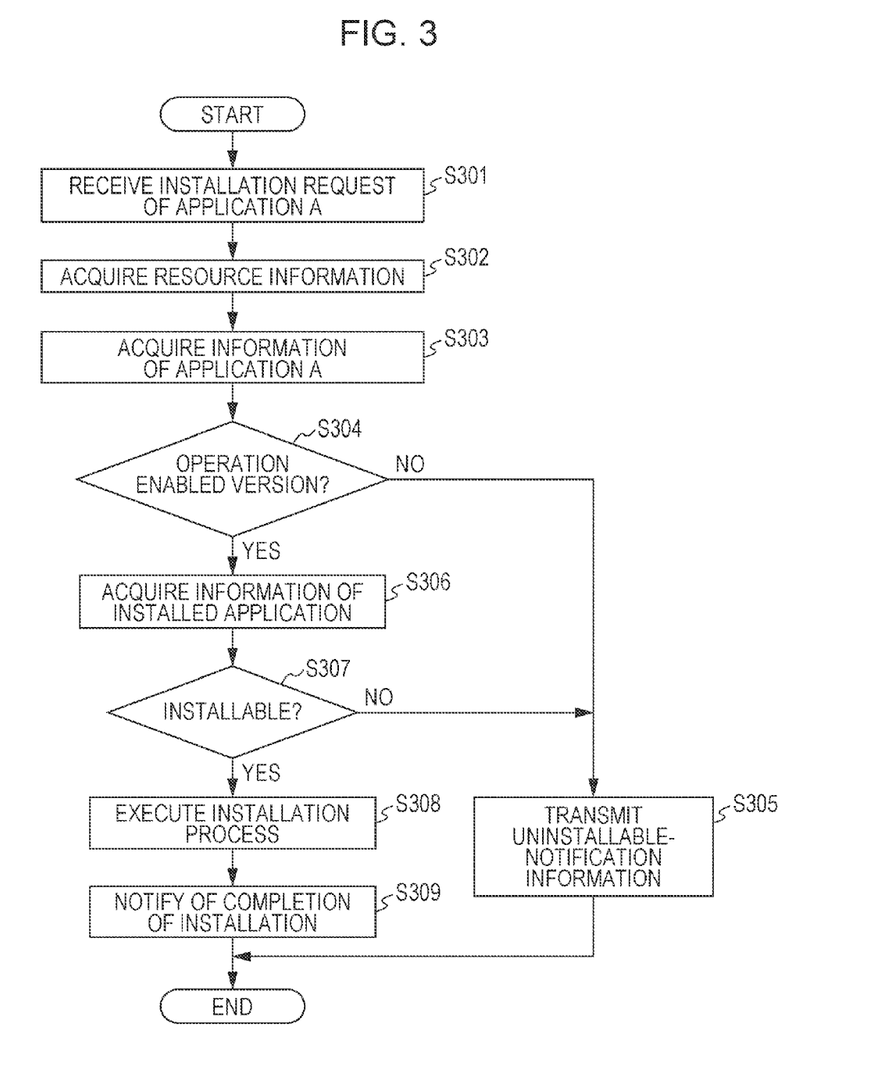
FIG. 3 is a flowchart illustrating an operation example of the operation determination unit of the first exemplary embodiment.

FIG. 3 is a flowchart illustrating the operation of the operation determination unit of the first exemplary embodiment.

The operation of the operation determination unit of the first exemplary embodiment is described with reference to FIGS. 2 and 3.

Three operation modes of the application program, i.e., a first operation mode, a second operation mode, and a third operation mode are available herein. The number of application programs concurrently operable is two in the first operation mode, the number of application programs concurrently operable is three in the second operation mode, and the number of application programs concurrently operable is unlimited in the third operation mode. It is noted that multiple concurrent operations of the same one application program are not allowed. As an example of application modes, an application program runs at a high process speed (in the first operation mode), runs at a standard process speed (in the second operation mode), and runs at a low process speed (in the third operation mode). The more the use amount of resource such as of the RAM 12 increases, the higher the process speed becomes. Since the resource such as the RAM 12 is typically limited, the number of application programs operable at higher mode (faster mode) is limited to a smaller value.

Application program B, application program C, application program D, application program E, application program F, application program G, and application program H (respectively hereinafter referred to as application B, application C, application D, application E, application F, application G, and application H) may now be already installed applications, and application program A (application A) may now be additionally installed. If an application program is not particularly discriminated from other application programs in the following discussion, that application program is simply referred to as an "application."

The installation receiver unit 101 receives from an installer a request to install the application A (step S301). The installation receiver unit 101 then receives an execution file and a definition file of the application A together with the request to install the application A. The installer in the exemplary embodiment is a program running on an external device, such as a personal computer (PC) connected to the communication interface 18 (see FIG. 1). Alternatively, the installer may be one of the applications operable on the image forming apparatus 10.

The resource information acquisition unit 102 acquires resource information used to run the application on the image forming apparatus 10 (step S302). More specifically, the resource information acquisition unit 102 acquires, as the resource information, an application frame work version (hereinafter referred to as "FW-ver"). The resource information acquisition unit 102 further acquires information of a maximum memory size (hereinafter referred to as "FW-mem") that is usable to allow the application on the RAM 12 in the image forming apparatus 10 to operate. The "FW-mem" is a maximum memory size that is available for the application to run in response to an installation request of the application A.

The application program information acquisition unit 103 acquires information of the application A (step S303). More specifically, the application program information acquisition unit 103 acquires as the information of the application A an application frame work version (hereinafter referred to as "A-enableFW-ver") of the application A that is enabled from the definition file of the application A. The application program information acquisition unit 103 further acquires the use amount of the RAM 12 in each operation mode of the application A from the definition file of the application A.

The determining unit 104 then compares "FW-ver" with "A-enableFW-ver" to determine whether the application A is an enabled version (step S304). More specifically, the determining unit 104 determines whether a relationship of "FW-ver"≥"A-enableFW-ver" holds true.

If t "FW-ver"<"A-enableFW-ver" (the application A is not an enabled version) (no branch from step S304), the determining unit 104 determines that the application A is uninstallable. The determining unit 104 transmits to the installer via the determination result transmitter unit 105 a notification that the application A is uninstallable (step S305).

If "FW-ver"≥"A-enableFW-ver" (the application A is an enabled version) (yes branch from step S304), the application program information acquisition unit 103 acquires information of applications that have been installed (step S306). More specifically, the application program information acquisition unit 103 acquires the definition file of each of the application B, the application C, the application D, the application E, the application F, the application G, and the application H, and acquires a maximum use amount of the RAM 12 of each application in each operation mode. The maximum use amount of the RAM 12 refers to a maximum value (peak value) of the memory used when the application runs in each operation mode.

The determining unit 104 determines in accordance with the acquired information of each application whether the application A is installable (step S307).

More specifically, the determining unit 104 operates as described below.

A predetermined number of applications having higher use amounts of the RAM 12 out of all applications including the application A are selected in each mode, and the sum of the maximum use amounts of the RAM 12 in each operation mode in the selected applications is calculated.

Of upper two applications having higher use amounts of the RAM 12 in the first operation mode, the sum of maximum use amounts of the RAM 12 is calculated. More specifically, applications using higher use amounts of the RAM 12 of an operable number are selected in the first operation mode, and the sum of the maximum use amounts of the RAM 12 of the selected applications in the first operation mode is calculated.

The maximum use amounts of the RAM 12 of the application B and the application C in the first operation mode may be respectively "B-mem-mode1" and "C-mem-mode1," and the application B and the application C may have two highest use amounts of the RAM 12. The sum of "B-mem-mode1" and "C-mem-mode1" is "Max-mem-mode1."

Calculated next is the sum of the maximum use amounts of the RAM 12 of three applications in the second operation mode (the number of applications operable in the second operation mode).

If the upper three applications are the application A, the application B, and the application C, the sum may be "Max-mem-mode2" (="A-mem-mode2"+"B-mem-mode2"+"E-mem-mode2").

In the third operation mode, the number of applications operable in the first and second operation modes is subtracted from the number of all applications having higher use amounts of the RAM 12, and the resulting applications are selected. The sum of maximum use amounts of the RAM 12 of resulting applications is calculated. In this example, the number of all applications is eight, the number of applications operable in the first operation mode is two, and the number of applications operable in the second operation mode is three. The number of selected applications is 8−(2+3)=3. The sum of the highest use amounts of the RAM 12 of the upper three applications is calculated. If the application A, the application B, and the application E are the upper three applications, the sum is "Max-mem-mode3" (="A-mem-mode3"+"B-mem-mode3"+"E-mem-mode3").

The determining unit 104 then determines in accordance with "Max-mem-mode1," "Max-mem-mode2," and "Max-mem-mode3" whether the application A is installable.

More specifically, the determining unit 104 determines the sum of maximum use amounts of the RAM 12 operable in the operation modes is equal to or smaller than FW-mem. In other words, the determining unit 104 determines a relationship of "Max-mem-mode1"+"Max-mem-mode2"+"Max-mem-mode3"≤"FW-mem" holds true.

If the relationship of "Max-mem-mode1"+"Max-mem-mode2"+"Max-mem-mode3"≤"FW-mem" holds true (the application A is installable) (yes branch from step S307), the determining unit 104 determines that the application A is installable, and the installation execution unit 106 performs an install operation of the application A (step S308). When the install operation ends, the installation execution unit 106 transmits to the installer via the determination result transmitter unit 105 a notification that the application A has been completed (step S309).

If a relationship of "Max-mem-mode1"+"Max-mem-mode2"+"Max-mem-mode3">"FW-mem" holds true (the application A is not installable) (no branch from step S307), the determining unit 104 determines that the application A is not installable), and then notifies the installer via the determination result transmitter unit 105 a notification that the application A is not installable (step S305).

The number of operation modes is 3 in the above case. The same method is applicable if the number of operation modes is larger than 3.

Second Exemplary Embodiment

In a second exemplary embodiment, a first operation mode and a second operation mode are available as operation modes of the applications, and when an application runs in the first operation mode, another application runs only in the second operation mode. However, it is noted that an application may concurrently run in multiple operation modes. More specifically, an application may run concurrently in the first operation mode and the second operation mode. As examples of operation modes described below, the application is operable with the operation panel 15 used (a first operation mode), and the application is operable in the background with the operation panel 15 not used (a second operation mode). Since only a single operation panel 15 is used, the number of applications operable in the first operation mode with the operation panel 15 used is one. A maximum use amount of memory in each operation mode is defined in the definition file of the operation mode.

An operation of the operation determination unit of the second exemplary embodiment is described below.

The functional structure of the operation determination unit of the second exemplary embodiment is identical to that of FIG. 2. The operation example of the operation determination unit of the second exemplary embodiment is also identical to that of FIG. 3.

The operation of the operation determination unit of the second exemplary embodiment is described with reference to FIGS. 2 and 3.

Steps S301 through S305 in the second exemplary embodiment are respectively identical to those in the first exemplary embodiment. In step S303, the application program information acquisition unit 103 acquires a use amount of the RAM 12 of the application A in each application mode from the definition file of the application A. The use amounts of the RAM 12 then acquired may include a use amount of the RAM 12 by the application A with the operation panel 15 used (hereinafter referred to as "A-mem-full") and a use amount of the RAM 12 by the application A (operated in the background) with the operation panel 15 not used (hereinafter referred to as "A-mem-limited").

A process subsequent to step S306 is described below.

If a relationship of "FW-ver"≥"A-enableFW-ver" holds true (the application A is an enabled version) (yes branch from step S304), the application program information acquisition unit 103 acquires information of an installed application (step S306). More specifically, the application program information acquisition unit 103 acquires the definition file of each already installed application. Already installed applications may be the "application B," the "application C," and the "application D." The application program information acquisition unit 103 acquires the definition files of the application B, the application C, and the application D.

From the acquired definition file, the application program information acquisition unit 103 acquires the use amount of the RAM 12 by each installed application with the operation panel 15 used and the use amount of the RAM 12 by each installed application with the operation panel 15 not used.

The use amounts of the RAM 12 by the application B, the application C, and the application D with the operation panel 15 used are respectively referred to as "B-mem-full," "C-mem-full," and "D-mem-full." The use amounts of the RAM 12 by the application B, the application C, and the application D with the operation panel 15 not used are respectively referred to as "B-mem-limited," "C-mem-limited," and "D-mem-limited."

The determining unit 104 determines in accordance with the acquired information of the application whether the application A is installable (step S307).

More specifically, the following process may be performed.

The determining unit 104 determines the largest use amount from among "A-mem-full," "B-mem-full," "C-mem-full," and "D-mem-full." The largest use amount is herein referred to as "max-mem-full."

The determining unit 104 determines whether the sum of "max-mem-full," "A-mem-limited," "B-mem-limited," "C-mem-limited," and "D-mem-limited" is equal to or smaller than "FW-mem." More specifically, the determining unit 104 determines whether a relationship of "max-mem-full"+"A-mem-limited"+"B-mem-limited"+"C-mem-limited"+"D-mem-limited"≤"FW-mem" holds true.

If the relationship of "max-mem-full"+"A-mem-limited"+"B-mem-limited"+"C-mem-limited"+"D-mem-limited"≤"FW-mem" holds true (the application A is installable) (yes from step S307), the determining unit 104 determines that the application A is installable. The installation execution unit 106 installs the application A (step S308). Upon installing the application A, the installation execution unit 106 transmits to the installer via the determination result transmitter unit 105 a notification that the application A has been installed (step S309).

If a relationship of "max-mem-full"+"A-mem-limited"+"B-mem-limited"+"C-mem-limited"+"D-mem-limited">"FW-mem" holds true (the application A is not installable) (no branch from step S307), the determining unit 104 determines that the application A is not installable. The determining unit 104 transmits to the installer via the determination result transmitter unit 105 a notification that the application A is not installable (step S305).

Upon receiving from the determination result transmitter unit 105 the notification that the application A has been installed, the installer notifies a user that the application A has been successfully installed. Upon receiving from the determination result transmitter unit 105 the notification that the application A is not installable, the installer notifies the user that the installation of the application A has failed. Optionally, the installer may acquire, from the operation determination unit, information about a reason as to why the installation has failed and may notify the user of the reason together.

In the second exemplary embodiment, the determining unit 104 checks in step S307 whether the application A is operable on the RAM 12. If the number of operation panels 15 is one, the number of applications operable with the operation panel 15 used is also one. The other application runs in the background. When one application runs, the use amount of the RAM 12 by the one application is "max-mem-full" at maximum. Even if all the other applications are operated with the operation panel 15 not used (operated in the background), the use amount of the RAM 12 of the applications operating in the background does not exceed "A-mem-limited"+"B-mem-limited"+"C-mem-limited"+"D-mem-limited." If the total sum of "max-mem-full"+"A-mem-limited"+"B-mem-limited"+"C-mem-limited"+"D-mem-limited" is equal to or smaller than "FW-mem," the RAM 12 will not be insufficient even if the "application A," the "application B," the "application C," and the "application D" are all operated.

If the relationship of "max-mem-full"+"A-mem-limited"+"B-mem-limited"+"C-mem-limited"+"D-mem-limited"≤"FW-mem" holds true, the application A, if additionally installed, will not cause the RAM 12 to be insufficient in capacity. The applications are free from being disabled.

As described above, the operation determination unit acquires the information related to the resource amount that causes the application of the image forming apparatus 10 to be operable. When the installation of a new application is intended, the operation determination unit determines, in accordance with the resource amount with the operation panel 15 used and the resource amount with the operation panel 15 not used, whether the application is operable and then determines whether the new application is to be installed or not.

The application runs with the operation panel 15 used or runs in the background with the operation panel 15 not used. If the sum of a maximum of the resource amounts of the applications with the operation panel 15 used and the resource amounts of all the applications running with the operation panel 15 not used is equal to or smaller than the resource amount usable on the image forming apparatus 10, the operation determination unit determines that the application is operable.

Third Exemplary Embodiment

The operation determination unit determines whether the additional application is installable in the previous exemplary embodiment. Alternatively, the additional application may first be installed, and then when the application is started up, the operation determination unit may then determine whether the application is operable.

Figure 4:
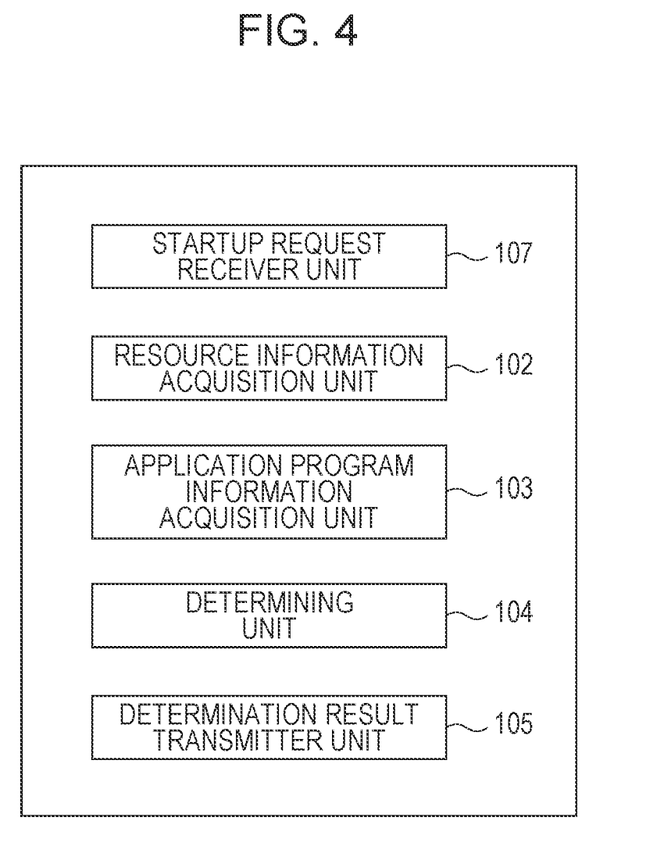
FIG. 4 is a functional block diagram of an operation determination unit of a second exemplary embodiment.

FIG. 4 is a functional block diagram illustrating an operation determination unit of a third exemplary embodiment.

As illustrated in FIG. 4, the operation determination unit includes a startup request receiver unit 107, a resource information acquisition unit 102, an application program information acquisition unit 103, a determining unit 104, and a determination result transmitter unit 105. The startup request receiver unit 107 receives a request to start up an application program. The resource information acquisition unit 102 acquires resource information of the image forming apparatus 10. The application program information acquisition unit 103 acquires information concerning an already installed application program. Based on the resource information and the application program of the image forming apparatus 10, the determining unit 104 determines whether the application program that is requested to start is operable. The determination result transmitter unit 105 transmits determination results of the determining unit 104.

The structure of the operation determination unit of FIG. 4, if compared with the structure of the operation determination unit of FIG. 2, includes no installation execution unit 106 but includes the startup request receiver unit 107 in place of the installation receiver unit 101.

An operation of the operation determination unit of the third exemplary embodiment is described.

Figure 5:
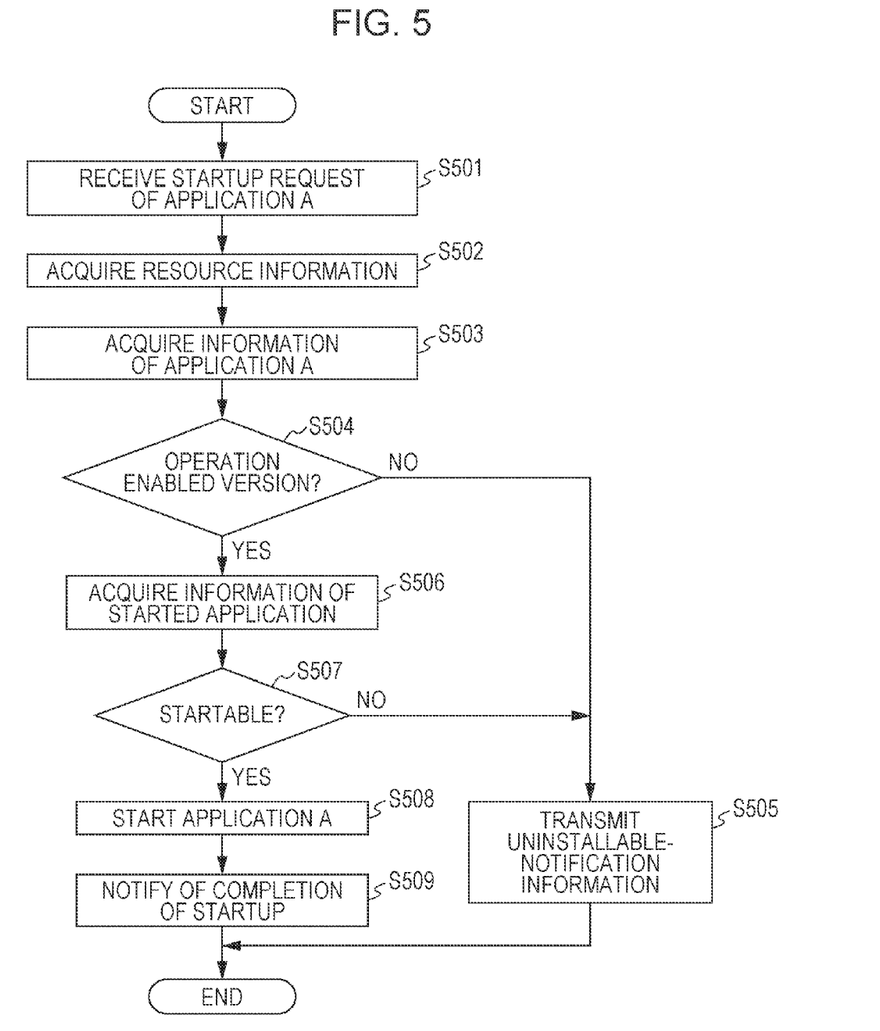
FIG. 5 is a flowchart illustrating an operation example of the operation determination unit of the second exemplary embodiment.

FIG. 5 is a flowchart illustrating an operation example of the operation determination unit of the third exemplary embodiment.

The operation of the operation determination unit of the third exemplary embodiment is described with reference to FIGS. 4 and 5. Three operation modes of the application program, i.e., a first operation mode, a second operation mode, and a third operation mode are available herein. The number of application programs concurrently operable is one in the first operation mode, the number of application programs concurrently operable is two in the second operation mode, and the number of application programs concurrently operable is unlimited in the third operation mode. It is noted that multiple concurrent operations of the same one application program are not allowed.

The startup request receiver unit 107 receives a request of a startup operation mode at which one of the installed applications (hereinafter referred to as an "application A") is to be started up (step S501). It is assumed that the application A operates in the second operation mode.

Steps S502 through S504 are respectively identical to steps S302 through S304 described with reference to FIG. 3.

In step S505 thereafter, the operation determination unit performs the following operations.

If "FW-ver"<"A-enableFW-ver" (the application A is not an enabled version) (no branch from step S504), the determining unit 104 determines that the application A is not startable. The determining unit 104 then transmits to the operation panel 15 via the determination result transmitter unit 105 a notification that the application A is not startable (step S505).

If "FW-ver"≥"A-enableFW-ver" (the application A is an enabled version) (yes branch from step S504), the application program information acquisition unit 103 acquires information of each started application (step S506). For example, the started applications may be five applications inclusive of an "application B," an "application C," an "application D," an "application E," and an "application F." The application B runs in the first operation mode, the application C runs in the second operation mode, and the applications D, E, and F run in the third application. In such a case, the application program information acquisition unit 103 acquires definition files of the application B, the application C, the application D, the application E, and the application F.

The application program information acquisition unit 103 then acquires the maximum use amounts of the RAM 12 of the started applications in each operation mode from the acquired definition files.

In accordance with the third exemplary embodiment, the application program information acquisition unit 103 acquires the maximum use amounts of the RAM 12 by the started applications B, C, D, E, and F in the active operation modes thereof. The maximum use amount by the application B in the first operation mode is represented as "B-mode1-mem," and the maximum use amount by the application C in the second operation mode is represented as "C-mode2-mem." The maximum use amounts by the application D, the application E, and the application F in the third operation mode are respectively represented as "D-mode3-mem," "E-mode3-mem," and "F-mode3-mem."

The determining unit 104 determines whether the sum of the thus acquired maximum use amounts of the RAM 12 by the application B, the application C, the application D, the application E, and the application F and the maximum usable amount of the RAM 12 by the application A in the second operation mode is equal to or smaller than the maximum usable memory size of the applications (FW-mem) (step S507). The operation in step S507 is thus identical to the operation in step S307 of FIG. 3. In this case, the determining unit 104 determines whether a relationship of "A-mode2-mem"+"B-mode1-mem"+"C-mode2-mem"+"D-mode3-mem"+"E-mode3-mem"+"F-mode3-mem"≤"FW-mem" holds true. If the number of applications running in the second operation mode is two, the determining unit 104 determines that the application is not startable.

If the relationship of "A-mode2-mem"+"B-mode1-mem"+"C-mode2-mem"+"D-mode3-mem"+"E-mode3-mem"+"F-mode3-mem"≤"FW-mem" holds true (the applications are startable) (yes branch from step S507), the determining unit 104 determines that the application A is startable, and the application A is started up (step S508). When the startup is complete, the determining unit 104 transmits to the operation panel 15 via the determination result transmitter unit 105 a notification that the application A has been started up (step S509).

If a relationship of "A-mode2-mem"+"B-mode1-mem"+"C-mode2-mem"+"D-mode3-mem"+"E-mode3-mem"+"F-mode3-mem">"FW-mem" holds true (the applications are not startable) (no branch from step S507), the determining unit 104 determines that the application A is not startable, and transmits to the operation panel 15 via the determination result transmitter unit 105 that the application A is not startable (step S505).

Upon receiving from the determination result transmitter unit 105 the notification that the application A has been started up, the operation panel 15 notifies the user that the application A has successfully started up. Upon receiving from the determination result transmitter unit 105 the notification that the application A is not startable, the operation panel 15 notifies the user that the application A has failed to start up.

When the function of the application is to be validated, the startup request receiver unit 107 receives a request to start the application. The startup request receiver unit 107 also receives the request to start the application when the user performs on the operation panel 15 an operation to use a function of a particular application. Furthermore, the startup request receiver unit 107 receives the request to start the application, when the user desires to use a function of a particular application in response to a request from the image forming unit 17.

In the above discussion, the operation mode of the application A to be started up is determined at the startup of the application A. The present invention is not limited to this method. In one method, startability may be checked beginning with an upper operation mode. In such a case, the determining unit 104 determines whether the number of applications running in the first operation mode as the upper operation mode is equal to or lower than a predetermined number. The determining unit 104 next determines whether the application is startable in a lower operation mode. The determining unit 104 finally determines whether a sufficient memory space is available in the startable operation mode. Even if a sufficient memory space is not available in an upper operation mode, the determining unit 104 may take an additional determination step as to whether a sufficient memory space is available or not if the application is started up in a lower operation mode. This method may be useful when the operation mode is determined by the process speed.

Fourth Exemplary Embodiment

In the first exemplary embodiment, the image forming apparatus 10 determines whether the additional application program is installable. The present invention is not limited to this method. For example, the installer may perform the same determination operation.

Figure 6:
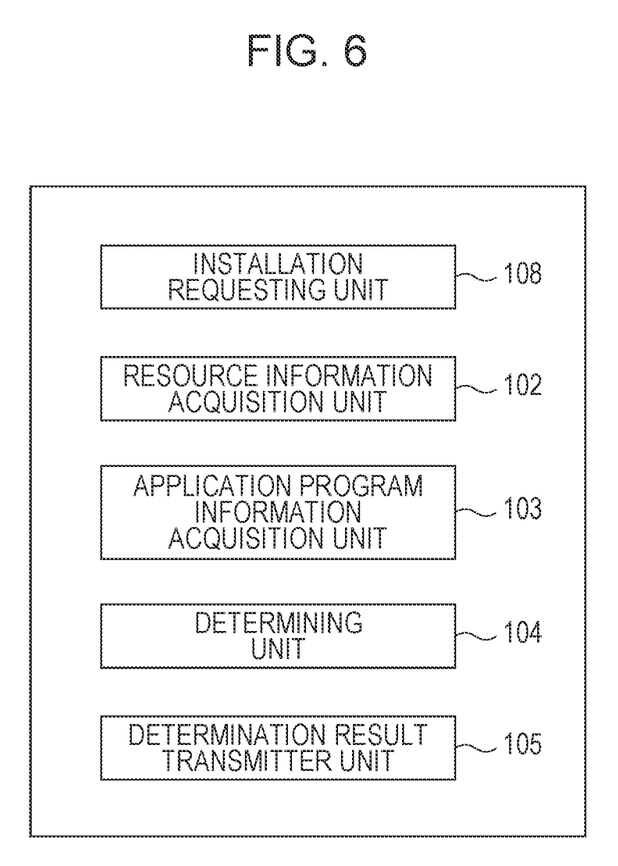
FIG. 6 is a functional block diagram of an operation determination unit of a third exemplary embodiment.

FIG. 6 is a functional block diagram of an operation determination unit of a fourth exemplary embodiment.

As illustrated in FIG. 6, the operation determination unit includes an installation requesting unit 108, a resource information acquisition unit 102, an application program information acquisition unit 103, a determining unit 104, and a determination result transmitter unit 105. The installation requesting unit 108 transmits a request to install an additional application program. The resource information acquisition unit 102 acquires resource information of the image forming apparatus 10. The application program information acquisition unit 103 acquires information concerning an already installed application program and the additional application program. Based on the resource information and the application program of the image forming apparatus 10, the determining unit 104 determines whether the application program is operable, and then determines whether the additional application program is to be installed. The determination result transmitter unit 105 transmits determination results of the determining unit 104.

The structure of the operation determination unit of FIG. 6, if compared with the structure of the operation determination unit of FIG. 2, includes no installation execution unit 106 but includes the installation requesting unit 108 in place of the installation receiver unit 101.

An operation of the operation determination unit of the fourth exemplary embodiment is described below.

Figure 7:
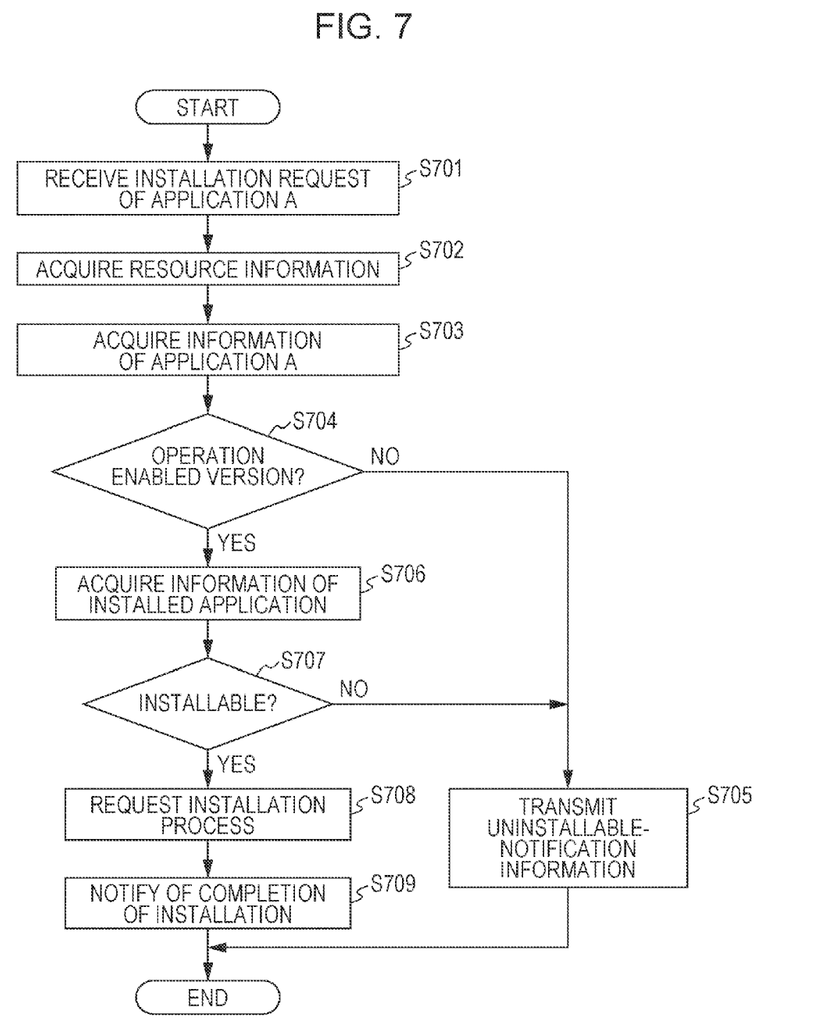
FIG. 7 is a flowchart illustrating an operation example of the operation determination unit of the third exemplary embodiment.

FIG. 7 is a flowchart illustrating an operation example of the installer of the fourth exemplary embodiment.

The operation of the operation determination unit of the fourth embodiment is described with reference to FIGS. 6 and 7.

The installation requesting unit 108 transmits to the image forming apparatus 10 a request to install a desired application to be added (hereinafter referred to as an "application A") (step S701).

Steps S702 through S704 are respectively identical to steps S302 through S304 described with reference to FIG. 3. In step S702, the installer acquires "FW-ver" and "FW-mem" from the image forming apparatus 10. In step S703, the installer acquires information from the definition file of the application A from therewithin.

In step S705 thereafter, the installer performs the following operations.

If "FW-ver"<"A-enableFE-ver" (no branch from step S704), the determining unit 104 determines that the application A is not installable (step S705).

Steps S706 and S707 are identical to steps S306 and S307 described with reference to FIG. 3. In step S706, however, the installer requests information of installed applications from the image forming apparatus 10 and then acquires the information.

In step S708 thereafter, the installer performs the following operations.

If the application A is installable (yes branch from step S707), the determining unit 104 determines that the application A is installable, and requests the image forming apparatus 10 to perform an install operation of the application A (step S708). Upon completing the install operation, the image forming apparatus 10 notifies the installer in reply to the install request that the application A has been successfully installed (step S709).

If the application A is not installable (no branch from step S707), the determining unit 104 determines that the application A is not installable (step S705).

When a personal computer or the like with the installer running thereon receives from the image forming apparatus 10 the notification that the application A has been installed, the personal computer notifies the user that the installation of the application A has been completed. If the installer determines that the application A is not installable, the personal computer notifies the user that the installation of the application A has failed.

The present invention is not limited to the exemplary embodiments as long as the exemplary embodiments fall within the scope of the present invention.

EXAMPLES

The application A may now be installed with the application B, the application C, and the application D already installed in the same manner as in the second exemplary embodiment.

The maximum memory size "FW-mem" of the RAM 12 causing the application to run on the image forming apparatus 10 may now be 100 Mbytes.

The following table lists in an operation panel use amount item "A-mem-full," "B-mem-full," "C-mem-full," and "D-mem-full" as use amounts of the RAM 12 respectively by the application A, the application B, the application C, and the application D with the operation panel 15 used. The following table also lists in an operation panel unused amount item "A-mem-limited," "B-mem-limited," "C-mem-limited," and "D-mem-limited" as use amounts of the RAM 12 respectively by the application A, the application B, the application C, and the application D with the operation panel 15 not used.

The application D has 0 Mbytes as "D-mem-limited" because the application D typically uses the operation panel 15 and does not run in the background.

TABLE

| | Operation panel use amount (Mbytes) | Operation panel unused amount (Mbytes) |
|---|---|---|
| Application A | 30 | 10 |
| Application B | 30 | 15 |
| Application C | 40 | 10 |
| Application D | 20 | 0 |

The determining unit 104 performs the following calculation operations.

Since "max-mem-full" is "C-mem-full" of 40 Mbytes, "max-mem-full"+"A-mem-limited"+"B-mem-limited"+"C-mem-limited"+"D-mem-limited"=40+10+15+10+0=75 Mbytes.

Since "FW-mem"=100 Mbytes, the relationship of "max-mem-full"+"A-mem-limited"+"B-mem-limited"+"C-mem-limited"+"D-mem-limited"≤"FW-mem" holds true.

The determining unit 104 thus determines that the application A is installable.

Comparative Examples

In a comparative example as the related-art method in which the use amounts of the RAM 12 with all functions of the applications activated are simply summed, the total sum is determined by summing "A-mem-full," "B-mem-full," "C-mem-full," and "D-mem-full."

Since the total sum is 30+30+40+20=120 Mbytes, the related-art method draws the conclusion that the application A is not installable. However, even if the application A is installed as described above, no problem arises in the operation of the applications. The determination based on the comparative example as to whether the application A is installable inconveniences the user.

The example makes less possible the application failure to operate subsequent to the installation of the additional application program. If the operation of the additional application is not guaranteed, the installation of the additional application is canceled because the additional application is not installable. This arrangement allows the user to handle the image forming apparatus more easily than when the additional program is installed first. Repetition of installation and uninstallation of the application is avoided. User friendliness is increased.

The above described operation is based on the premise that the use amount of the RAM 12 in each operation mode by each application is acquired. The definition file of the application may store one use amount of the RAM 12. In such a case, this value may be used as the use amount of the RAM 12 in all the operation modes in calculation.

In some cases, no use amount of the RAM 12 may be written on the definition file of the application. One method to cope with such an occasion is to check in advance the use amount of the RAM 12 by an application in each operation mode. The application is labeled identification (ID), and an association table that associates the ID with the use amount of the RAM 12 in each operation mode is created in advance. If the use amount of the RAM 12 is not written on the definition file of the application, the application program information acquisition unit 103 acquires the use amount of the RAM 12 by referencing the association table.

In another option, the use amount of the RAM 12 in each operation mode is prepared as a predetermined value, and the predetermined value is then used. The predetermined value is desirably a larger value. For example, the maximum one of use amounts of the RAM 12 by the applications created in the past to operate the image forming apparatus 10 may be selected as a predetermined value.

The maximum use amount of the RAM 12 by each application in each operation mode is acquired from the definition file. The present invention is not limited to this method. For example, the maximum use amount of the RAM 12 by each application in each operation mode is acquired from an application program interface (API) of the application.

A predetermined number may be stored in a program as the number of applications operable in each operation mode. The number of applications operable in each operation mode may be stored on the HDD 14 for later modification and later reference.

In the above discussion, the determining unit 104 compares "FW-ver" with "A-enableFW-ver" in step S306 to determine whether "FW-ver" is younger in version than "A-enableFW-ver." In this way, the determining unit 104 first checks whether the application A is operable on the application frame work version. If plural versions of application framework are present, this process is desirable but not necessarily needed.

The resource amounts includes the size and the use amount of the RAM 12 in the above discussion. The present invention is not limited to these parameters. The resource amounts may include the size and use amount of the HDD 14. Furthermore, the resource amounts may include a usage count and usage time of a CPU core of the CPU 11.

In the above discussion, the image forming apparatus 10 is an example of the information processing apparatus. The present invention is not limited to the image forming apparatus 10. The exemplary embodiments are applicable to a determination as to whether a desired application program is installable and/or startable on the image forming program expected to run the operation program.

The operations of the operation determination unit in the exemplary embodiments are performed when the CPU 11 loads a variety of programs from the ROM 13 or the HDD 14 to the RAM 12 and then executes the programs.

The process performed by the operation determination unit may be understood as an application program in operation or an application program desired to be operated to cause a computer to perform a process. The process includes acquiring a resource amount to be used in each of a plurality of operation modes by the application program in operation or the application program desired to be operated, and determining, in accordance with the acquired resource amounts, whether the application program desired to be operated is installable and/or startable. The operation program desired to be operated is installed and/or started up in response to a result of the determining.

The process performed by the operation determination unit may be understood as an application program causing a computer to execute a process for processing information. The process includes acquiring a resource amount for an application program that operates an information processing apparatus using the operation unit and a resource amount for the application program that operates the information processing apparatus without using the operation unit, and determining in accordance with the acquired resource amounts whether the application program is installable and/or startable.

The program implementing the exemplary embodiments may be supplied via a communication unit, or may be supplied in a stored state on a recording medium such as CD-ROM.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
an application program information acquisition unit that acquires, for each application program in operation and an application program that is desired to be operated, an amount of resources to be used in each of a plurality of operation modes;
an operation determination unit that determines, in accordance with the amount of resources acquired by the application information acquisition unit, whether the application program desired to be operated is installable or executable; and
a resource information acquisition unit that acquires a total resource amount of the information processing apparatus and a number (N) of concurrently executable applications for each of the plurality of operation modes,
wherein the operation determination unit determines for each mode of the plurality of operation modes: a maximum resource use amount for each application executable in that mode, and a sum of resource use amounts of the N applications with the highest resource use amounts, and further determines a total resource use amount by summing the sums of the resource use amounts of the N applications for each mode of the plurality of operation modes, and wherein if the determined total resource use amount is equal to or lower than the total resource amount acquired by the resource information acquisition unit, the operation determination unit determines that the application program desired to be operated is installable or executable.

2. An information processing apparatus, comprising:
an operation unit that operates the information processing apparatus; and
an operation determination unit that acquires, for each application program of a plurality of application programs including a new application program to be installed and application programs that are installed in the information processing apparatus, an amount of resources used when an application program operates the information processing apparatus using the operation unit and when an application program operates the information processing apparatus without using the operation unit, and determines in accordance with the acquired amount of resources whether the application program to be installed is installable or executable,
wherein when the new application program is to be installed, the operation determination unit determines whether the new application program is operable, and then determines whether to install the new application program, and
wherein if a sum of a maximum value of the amount of resources used when the plurality of application programs operate the information processing apparatus using the operation unit and the amount of resources used when the plurality of application programs operate the information processing apparatus without using the operation unit is equal to or smaller than a resource amount usable by the information processing apparatus, the operation determination unit determines that the new application program is installable or executable.

3. The information processing apparatus according to claim 2, wherein the amount of resources comprises a use amount of a storage unit that stores the application program.

4. An information processing method comprising:
acquiring, for each application program in operation and an application program that is desired to be operated, an amount of resources to be used in each of a plurality of operation modes; and
determining, in accordance with the acquired amount of resources, whether the application program desired to be operated is installable or executable; and
acquiring a total resource amount of an information processing apparatus and a number (N) of concurrently executable applications for each of the plurality of operation modes,
wherein the determining determines for each mode of the plurality of operation modes: a maximum resource use amount for each application executable in that mode, and a sum of resource use amounts of the N applications with the highest resource use amounts, and further determines a total resource use amount by summing the sums of the resource use amounts of the N applications for each mode of the plurality of operation modes, and
wherein if the determined total resource use amount is equal to or lower than the total resource amount acquired by the acquiring, the determining determines that the application program desired to be operated is installable or executable.

5. An information processing method, comprising:
operating an information processing apparatus having an operation unit;
acquiring, for each application program of a plurality of application programs including a new application program to be installed and application programs that are installed in the information processing apparatus, an amount of resources used when an application program operates the information processing apparatus using the operation unit and when an application program operates the information processing apparatus without using the operation unit; and
determining in accordance with the acquired amount of resources whether the application program to be installed is installable or executable,
wherein when the new application program is to be installed, the determining determines whether the new application program is operable, and then determines whether to install the new application program, and
wherein if a sum of a maximum value of the amount of resources used when the plurality of application programs operate the information processing apparatus using the operation unit and the amount of resources used when the plurality of application programs operate the information processing apparatus without using the operation unit is equal to or smaller than a resource amount usable by the information processing apparatus, the determining determines that the new application program is installable or executable.

6. A non-transitory computer readable medium storing a program causing a computer to execute a process for processing information, the process comprising:
acquiring, for each application program in operation and an application program that is desired to be operated, an amount of resources to be used in each of a plurality of operation modes; and
determining, in accordance with the acquired amount of resources, whether the application program desired to be operated is installable or executable; and
acquiring a total resource amount of an information processing apparatus and a number (N) of concurrently executable applications for each of the plurality of operation modes,
wherein the determining determines for each mode of the plurality of operation modes: a maximum resource use amount for each application executable in that mode, and a sum of resource use amounts of the N applications with the highest resource use amounts, and further determines a total resource use amount by summing the sums of the resource use amounts of the N applications for each mode of the plurality of operation modes, and
wherein if the determined total resource use amount is equal to or lower than the total resource amount acquired by the acquiring, the determining determines that the application program desired to be operated is installable or executable.

7. A non-transitory computer readable medium storing a program causing a computer to execute a process for processing information, the process comprising:
operating an information processing apparatus having an operation unit;
acquiring, for each application program of a plurality of application programs including a new application program to be installed and application programs that are installed in the information processing apparatus, an amount of resources used when an application program operates the information processing apparatus using the operation unit and when an application program operates the information processing apparatus without using the operation unit; and determining in accordance with the acquired amount of resources whether the application program to be installed is installable or executable,
wherein when the new application program is to be installed, the determining determines whether the new application program is operable, and then determines whether to install the new application program, and
wherein if a sum of a maximum value of the amount of resources used when the plurality of application programs operate the information processing apparatus using the operation unit and the amount of resources used when the plurality of application programs operate the information processing apparatus without using the operation unit is equal to or smaller than a resource amount usable by the information processing apparatus, the determining determines that the new application program is installable or executable.

* * * * *